United States Patent Office 2,760,307
Patented Aug. 28, 1956

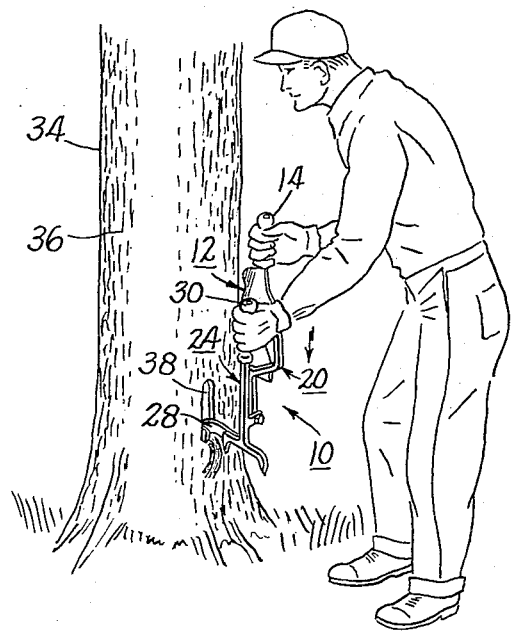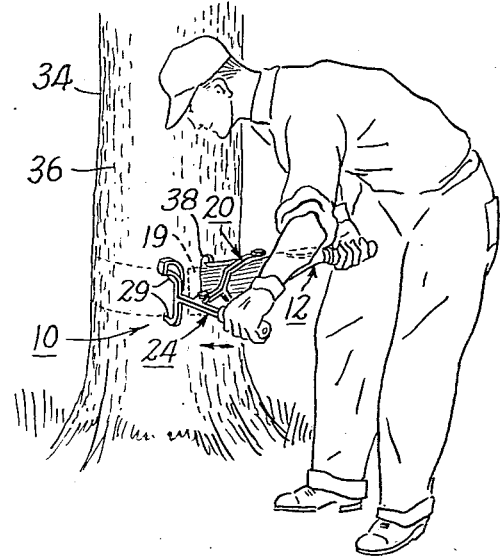

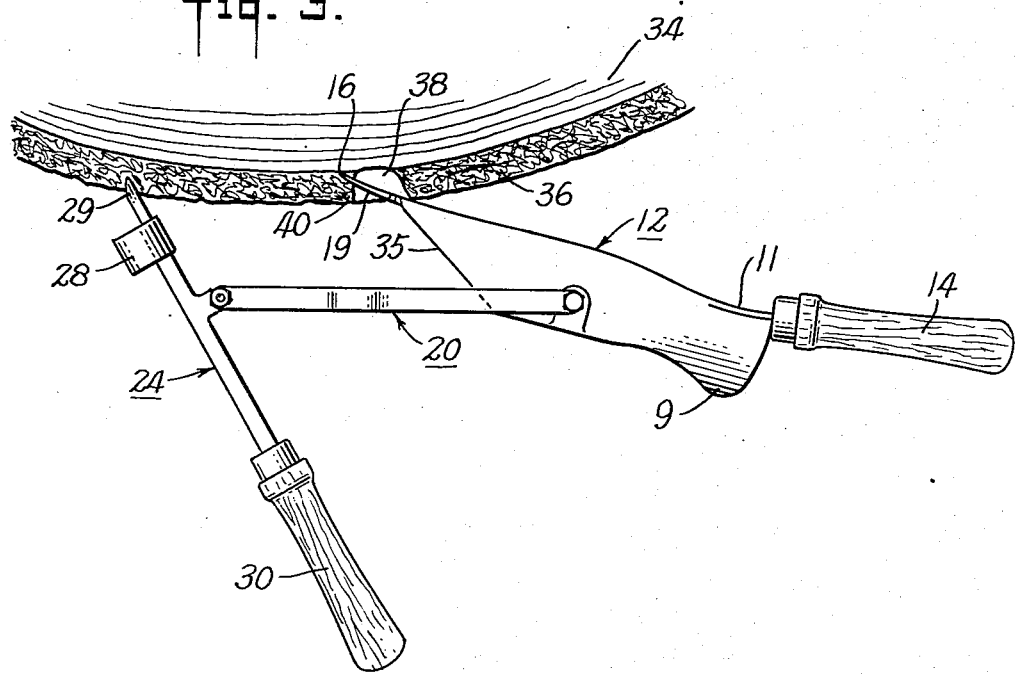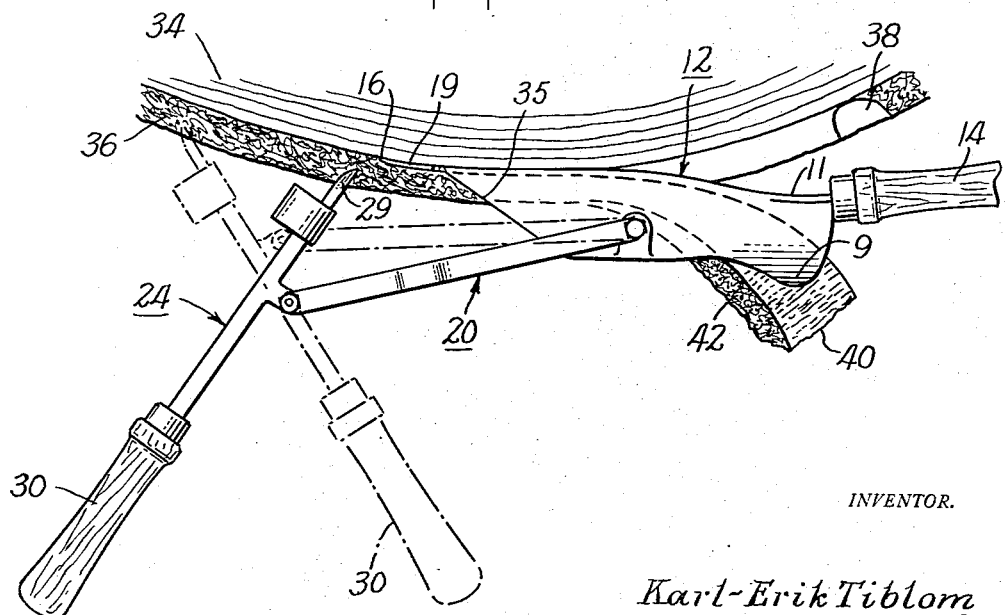

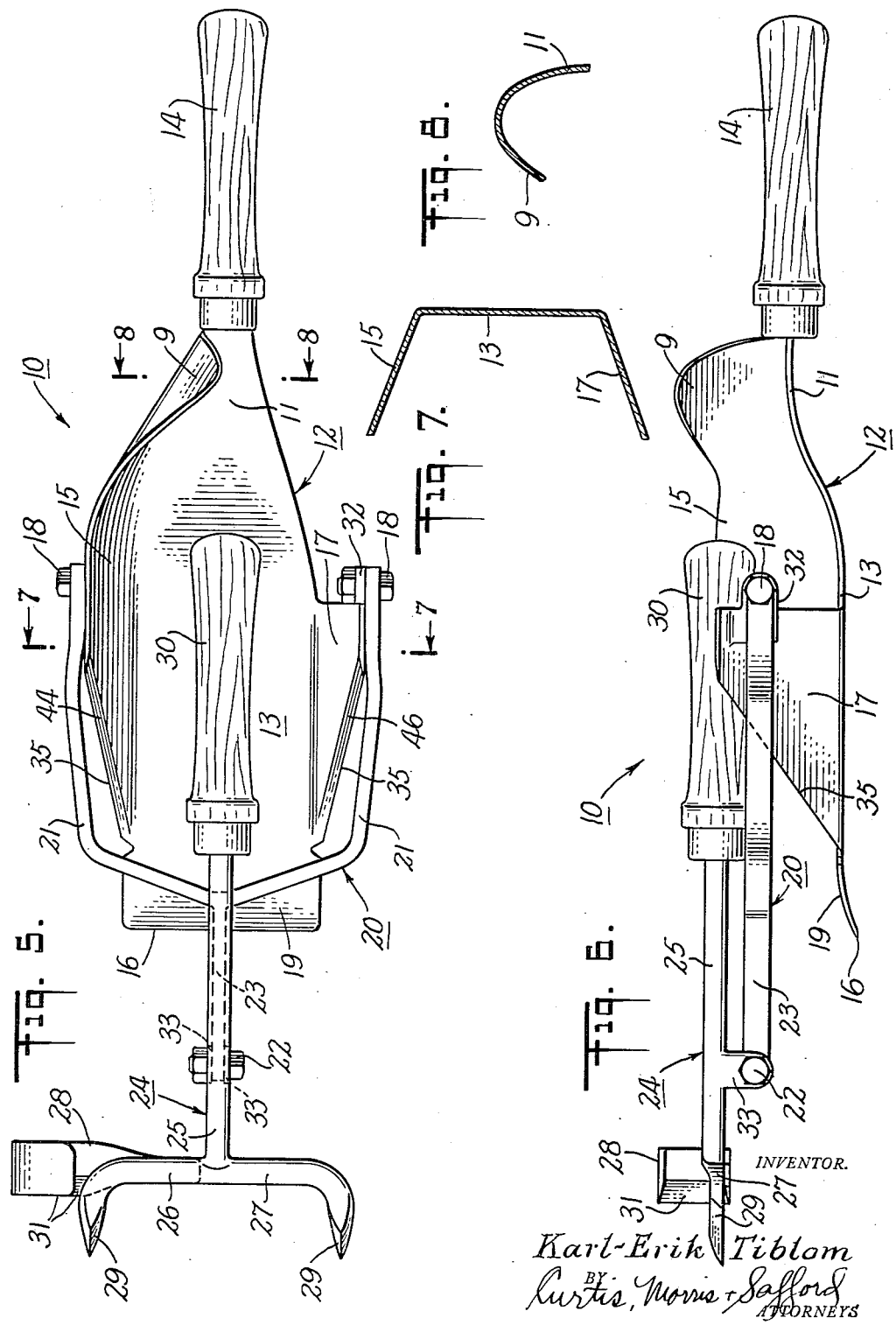

2,760,307

TOOL FOR REMOVING BARK FROM TREES

Karl-Erik Tiblom, Stockholm, Sweden, assignor to A B Odelberg & Olson, Stockholm, Sweden Application July 14, 1953, Serial No. 367,799

7 Claims. (Cl. 47—1)

This invention relates to the removal of bark from trees, and more particularly to a tool for removing a strip of bark from near the base of the tree trunk while the tree is still standing.

In lumbering operations, it is generally desirable to remove the bark prior to processing of the timber. In making paper from wood pulp, the removal of the bark is quite important because the presence of the bark impairs the quality of the paper and may interfere with the paper-making process. In the past, the bark removal has been a very serious problem to the paper-making industry, and the disposal of the bark has also been a problem. It has been found that the bark of a tree may be loosened "chemically" and then removed by a simple rolling or bumping operation. The present invention is concerned with a tool and method for the efficient and improved chemical treatment of trees and the removal of bark. Hence, an object of this invention is to provide an improved tool and method for carrying out the above. A further object is to provide an improved tool for removing an annular strip or collar of bark from a tree trunk. These and other objects will be in part obvious and in part pointed out below.

In accordance with the bark-removing method of the present invention, the standing tree is first "girdled" near its base, i. e., a strip of bark is removed to expose an annular strip of the wood or "skin." This annular strip is then painted with a chemical of a character that is carried by the tree sap up the tree trunk beneath the bark to the top of the tree, and which deadens the tree fibers so as to loosen the bark and probably kill the tree. After the bark has been thus loosened, the tree is cut and the bark readily peels off either during felling of the tree, or while the tree is being rolled to a loading point.

In accordance with the present invention, a tool is provided for performing the girdling operation in a superior manner and with rapidity and ease at a low level on the trunk of the standing tree. The tool has two handles which are readily grasped by the operator and by which the tool may be quickly and dependably manipulated. One of the handles is integral with a rigid bark-cutting and removing member, and the other handle is integral with a rigid forked member, having two very sharp-spaced prongs. These two members are interconnected by a forked link which is pivoted to each of the members so as to permit the forked member to be swung with respect to the bark-cutting and removing member. This tool is manipulated in a manner to be more fully set forth below, to peel a strip of bark from a tree as has been indicated above. In the drawings:

Figure 1 is a pictorial view of an operator using a tool, illustrative of the present invention, to form an initial vertical groove or channel in the tree bark;

Figure 2 is a view similar to Figure 1 showing the insertion at the end of the bark-cutting and removing member into the channel formed as in Figure 1;

Figure 3 is a top plan view of the tool positioned as at the start of the operation shown in Figure 2;

Figure 4 is a view similar to Figure 3 but showing the tool at the end of a stroke of operation;

Figure 5 is a top plan view of the tool in folded position;

Figure 6 is a side elevation of the tool positioned as in Figure 5; and

Figures 7 and 8 are sectional views, respectively on the lines 7—7 and 8—8 of Figure 5.

Referring to Figures 5 and 6 of the drawings, a bark-removing tool 10 includes a rigid bark-cutting and removing member 12, a bail-like link 20, and a fork member 24. Member 12 is of heavy gauge tempered sheet steel and is of general channel or scoop shape, and has at the right an integral handle 14. Member 12 has a flat main bottom wall or body portion 13, outwardly diverging side walls 15 and 17 (see Figure 7) and, at the left (see Figure 5), there is a curved lip or guide portion 19 having a leading blunt edge 16.

Side wall 15 extends to the right and terminates at handle 14 and it has an outwardly and downwardly extending portion 9 with the curvature shown in Figure 8. The bottom wall 13 has an upwardly curved portion 11 extending adjacent portion 9 to the level of substantially the center of the handle. Side wall 17 terminates (see Figure 6) at substantially the center of the member. At the left, the two side walls 15 and 17 are sharpened to provide cutting edges 35 (see Figure 5). These cutting edges extend at an angle of substantially 35° (see Figure 6) from the plane of the bottom wall 13, and these edges diverge (see Figure 5) by virtue of the outward slope of the side walls which are (see Figure 7) at an angle of 70° from the plane of the bottom wall.

Pivotally attached to member 12 is the bail-like member or link 20 which has arms 21 spanning member 12 and pivoted respectively to the side walls 15 and 17 by a pair of pivot bolts 18. As shown best in Figure 6, one pivot bolt 18 (see Figure 5) extends through an opening in side wall 15 below the top edge thereof, and the other bolt 18 extends through an opening in an ear 32 integral with wall 17.

Link 20 terminates at the left in a bar portion 23, the end of which is connected by a bolt 22 to a fork member 24. Fork member 24 has a main portion 25 from which (see Figure 6) two ears 33 project; these ears provide the pivot or hinge connection with link 20. Member 24 has at the left an integral pair of transverse arms 26 and 27, each of which terminates in a sharp prong 29 which projects parallel to portion 25. The upper arm 26 also has an integral cutter bracket 28, which presents at the left a cutting edge 31 (see also Figure 6). Bracket 28 is of a channel or somewhat inverted U-shape so that it is adapted to cut a groove or channel in the tree bark in a manner more fully discussed below.

The right hand end of portion 25 carries a handle 30 which is grasped by the left hand of the operator, while handle 14 is grasped by the right hand. The tool may then be manipulated in the manner illustrated in Figures 1 to 4. This manipulation includes holding the tool in somewhat the position of Figure 1, and pushing down on the two handles so as to cause the cutter bracket 28 to cut a vertical channel 38 in the bark 36 of a tree 34. During this operation, the tool is "collapsed" so that handle 30 is between the side walls 15 and 17 of member 10, and portion 25 is against link 23 and link 20 is against the lip portion 19. When in this position, the tool is rigid and is accurately controlled during the cutting of the groove 38.

The forming of this groove 38 in the tree bark is the initial step in the bark-removing or tree-girdling operation. It should be noted that the tool is readily manipulated to girdle the tree at a very low level, in fact, directly above the enlargement of the trunk at the ground.

Referring now to Figure 3, this groove 38 is entirely through the bark to the sap wood and is of a length equal to the width of the bark-cutting and removing member 12. The tool is then positioned, as in Figure 3, with the blunt edge 16 at the bottom of groove 38 and extending to the left along the surface of the wood. The fork member 24, at this time, is held free of the bark and the operator exerts force through handle 14 so as to push member 12 to the left to anchor the lip portion 19 beneath the bark edge 40 at the left of groove 38. This is somewhat tangential of the surface of the tree wood.

The operator then positions the forked member 24 in somewhat the position of Figure 3, and exerts force with his left hand through handle 30 to project the prongs 29 into the surface of the bark. During this operation, and the operations to be described below, the pivotal connections between link 20 and members 12 and 24 are sufficiently rigid to insure a smooth but well directed movement of member 24 with respect to member 12. At this time, the operator is positioned somewhat as in Figure 2, although in each of Figures 1 and 2 the operator is shown somewhat to the right of the preferred position so as to show the tool. He then holds handle 14 so that member 12 is tangential to the tree and swings handle 30 to the left, i. e., clockwise to the full line position of Figure 4. The fork member 24 acts as a lever to pull or drag the bark-cutting and removing member 12 tangentially with respect to the tree trunk. The blunt leading edge 16 tends to follow the wood surface directly beneath the bark and does not tend to cut the bark or the wood. The curvature of lip portion 19 is somewhat that of the wood surface so that it tends to guide the tool.

However, the cutting edges 35 of the side walls 15 and 17 readily cut the bark, and the angular relationship between these edges and the bark fibres insures ease of cutting. Referring to Figure 5, edges 35 are sharpened by grinding them from the inside, that is, the bevel produced by the sharpening operation is in each instance upon the top or inside wall surface. These surfaces 44 and 46 press upwardly upon the strip 42 of the bark between the walls, and this strip is simultaneously cut free by the cutting edges 35. This strip, therefore, tends to rise as the member 12 moves to the left (see Figure 4) and the flat bottom 13 moves beneath the strip.

When the fork member 24 reaches the full line position of Figure 4, it is pulled away from the bark, and it is swung or turned to the broken line position, and prongs 29 are again inserted into the bark in the advanced position. With these prongs anchored in the new position, member 24 is again swung clockwise, while member 12 maintains its tangential relationship with respect to the tree and is pulled to the left another step. This action is repeated and the right-hand end or edge 40 of the strip 42 tends to ride up away from the tree at 11, and simultaneously the top of the strip is engaged and pushed down by the overhanging portion 9 of the side wall 15; and this deflects the strip of bark outwardly. This operation is continued until the entire circumference of the tree is traversed, at which time an annular strip of the wood is exposed. No particles or patches of bark are left and the wood is not scarred or injured. The only strip of wood is then painted with a solution of sodium arsenite. The clean strip of wood makes the painting operation easy so that thorough coverage is obtained with minimum work and with a minimum wastage of this solution. As indicated above, this solution is carried upwardly by the tree sap so that the bark loosens. The tree is then cut and the bark may readily be removed either by a pounding or stripping operation or it may be effected by merely depending upon the rolling and other manipulation while transporting the logs to a log-loading station.

It is thus seen that an improved tool and method of operation has been provided which accomplishes the objects set forth above.

As indicated above, this operation is carried on efficiently and with little strain and without damage to the wood.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

I claim:

1. A tool for removing a strip of bark from the trunk of a tree comprising, a scoop-like member having a handle at one end and having a bark-stripping blade extending from the other, a tree-engaging member having a handle at one end and a pair of sharp prongs at the other for anchoring to the tree, and a rigid link member having one end attached to the sides of said scoop-like member between said handle and said scoop-like member and having its other end pivotally attached to said tree-engaging member at a pivot axis which is between said handle and said prongs and which is closer to said prongs.

2. A tool as described in claim 1 wherein said scoop-like member has one edge curved to form a bark guide to direct the bark downwardly as the tool is advanced around the tree.

3. A tool as described in claim 2 wherein the leading edges of said scoop-like member form gradually diverging cutting edges to cut the edges of the strip of bark free as the tool is advanced thereabout.

4. A tool for removing the bark from an annular strip of the trunk of a tree comprising; a scoop-like member having a handle at one end and a bark-stripping blade at the other and having a pair of outwardly projecting edge portions forming a bark-guiding channel; a tree-engaging member having a handle at one end, a pair of sharp prongs at the other, and a U-shaped cutting blade adjacent one of said prongs; and a yoke pivotally mounted on said scoop-like member and attached to the base of said tree-engaging member.

5. A tool as described in claim 4 wherein, said scoop-like member has a pair of bark-cutting blades formed on its leading edges, said blades and said U-shaped cutting blade being very sharp to cut the bark, and said bark-stripping blade being relatively blunt to guide the tool beneath the bark without damaging the wood of the tree.

6. In a device of the character described for removing bark from an annular strip of a tree trunk near the base thereof, combination of, a pair of elongated members each of which has a handle upon one end and has a tree-engaging portion, link means connecting said tree-engaging members near the respective centers thereof whereby the operator may grasp the two handles and swing the two members with respect to each other, one of said members having a groove-cutting element thereon which may be used by the operator to produce a vertical groove in the bark with one handle being held substantially beneath the other handle and with vertical forces being applied to both handles, one of said members being a bark-cutting and removing member which has a blunt leading edge which may be inserted in the groove in the bark and projected beneath the bark tangential to the tree, and the other of said members comprising means forming an anchor for attachments to the bark and means to exert forces to pull said bark-cutting and removing means tangentially from said groove whereby a vertical strip of the bark is removed.

7. A tool for removing the bark from an annular strip of the trunk of the tree comprising: a scoop-like member having a handle at one end which may be grasped by one hand, and having a bark-stripping blade at the other end and a pair of outwardly diverging edge portions forming a bark-guiding channel; a rigid tree-engaging member having a handle at one end which may be grasped by a hand and prong means at the other end which may be projected into the bark thereby to anchor said tree-engaging member; and a yoke pivotally mounted on said scoop-like member intermediate the ends thereof and attached to said tree-engaging member intermediate the ends thereof.

References Cited in the file of this patent

UNITED STATES PATENTS

| | | |
|---|---|---|
| 278,686 | Daigneau | June 5, 1883 |
| 432,769 | Schilling | July 22, 1890 |
| 984,013 | Maisel | Feb. 14, 1911 |
| 1,534,202 | Boley | Apr. 21, 1925 |
| 1,548,701 | Albert | Aug. 4, 1925 |
| 1,987,368 | McGary | Jan. 8, 1935 |
| 2,186,654 | Perry | Jan. 9, 1940 |

FOREIGN PATENTS

| | | |
|---|---|---|
| 170,518 | Austria | Feb. 25, 1952 |
| 757,500 | France | Oct. 9, 1933 |